United States Patent [19]
Cho et al.

[11] Patent Number: 5,864,300
[45] Date of Patent: Jan. 26, 1999

[54] COMMUNICATION SYSTEM FOR SELECTING A COMMUNICATION TRANSMISSION METHOD

[75] Inventors: Han-Jin Cho, Seoul; Young-Gyoo Choi, Suwon, both of Rep. of Korea

[73] Assignee: SamSung Electronics Co., Ltd., Kyungki-do, Rep. of Korea

[21] Appl. No.: 753,685

[22] Filed: Nov. 27, 1996

[30] Foreign Application Priority Data

Nov. 30, 1995 [KR] Rep. of Korea .................. 1995/45628

[51] Int. Cl.$^6$ ................... H04Q 5/22; H01J 9/00; G06F 12/00
[52] U.S. Cl. ............. 340/825.52; 395/200; 395/425; 370/475; 370/346
[58] Field of Search ............ 340/825.52; 395/821, 395/822, 823, 824, 825, 200.73, 425; 365/63; 370/475, 346

[56] References Cited

U.S. PATENT DOCUMENTS

| | | |
|---|---|---|
| 3,618,031 | 11/1971 | Kennedy et al. . |
| 3,828,325 | 8/1974 | Stafford et al. . |
| 4,246,637 | 1/1981 | Brown et al. . |
| 4,466,062 | 8/1984 | Krikor . |
| 4,803,623 | 2/1989 | Klashka et al. . |
| 5,202,963 | 4/1993 | Zelley . |
| 5,301,293 | 4/1994 | Kano ........................................ 395/425 |
| 5,343,030 | 8/1994 | Sanemitsu .............................. 235/492 |
| 5,345,412 | 9/1994 | Shiratsuchi ............................... 365/63 |
| 5,406,643 | 4/1995 | Burke et al. ....................... 395/200.73 |
| 5,440,697 | 8/1995 | Boegel et al. . |
| 5,459,453 | 10/1995 | Minerd et al. . |
| 5,499,384 | 3/1996 | Lentz et al. . |
| 5,528,758 | 6/1996 | Yeh . |
| 5,530,897 | 6/1996 | Meritt . |

*Primary Examiner*—Michael Horabik
*Assistant Examiner*—Jean B. Jeanglaude
*Attorney, Agent, or Firm*—Robert E. Bushnell, Esq.

[57] ABSTRACT

A wireless communication system and process for transmission of data communications, may be practiced with a microprocessor, a memory, a controller, a selector and a communication block, and the effect of the wireless communication system for selecting a communication transmission method lies in the fact that a user can select a wireless communication device according to user's needs in a wireless communication device having at least one communication transmission method or a plurality of wireless communication devices having different communication transmission methods, using only one controller.

4 Claims, 2 Drawing Sheets

COMMUNICATION SYSTEM FOR SELECTING A COMMUNICATION TRANSMISSION METHOD

CLAIM OF PRIORITY

This application makes claims all benefits accruing under 35 U.S.C. §119 from an application for A COMMUNICATION SYSTEM FOR SELECTING A COMMUNICATION TRANSMISSION METHOD earlier filed in the Korean Industrial Property Office on the $30^{th}$ day of the month of Nov. 1995 and there duly assigned Ser. No. 45628/1995.

BACKGROUND OF THE INVENTION

1. Field of the Invention

The present invention relates generally to communication systems enabling selection of alternative processes for transmission of communications and, more particularly, to communication systems for selecting a process for transmission of communications according to each users needs in a wireless communication device providing one or more modes for transmission of communications, or a plurality of wireless communication devices providing different modes for transmission of communication, using a single controller.

2. Description of Related Art

Earlier wireless communication systems using several communication devices tended to rely upon microprocessors generating communication signals to provide wireless communication. Two or more controllers responded to communication signals received from the microprocessor by generating control signals, while corresponding wireless communication devices, operated by control signals generated by corresponding controllers, transmitted data. An operation using a second one of the wireless communication devices in this type of earlier wireless communication system using several communication devices is explained as follows. The microprocessor generates a signal for designating the mode of wireless communication to be used, to the second controller. The second controller provides a control signal that drives the second wireless communication device, and the second wireless communication device transmits the data. We have found that these earlier wireless communication systems using several wireless communication devices are hindered by their need for a separate controller for driving a corresponding wireless communication device whenever the user seeks to use a wireless communication device that provides a mode for transmission of communications that is different from that provided by the other wireless communication devices.

In other fields such as data processing, exemplary efforts found in Zelley, U.S. Pat. No. 5,202,963 for a Method And Apparatus For Adapting A Remote Communications Controller To A Variety Of Types Of Communications Modems, Brown et al, U.S. Pat. No. 4,246,637 for a Data Processor Input/Output Controller, and Kennedy et al., U.S. Pat. No. 3,618,031, entitled Data Communication System, each endeavored to provide communication systems utilizing a central controller in conjunction with a plurality of input/output communication devices. We have observed however, that these efforts are not able to be readily implemented in a system that depends upon a plurality of wireless communication devices.

The Stafford et al., U.S. Pat. No. 3,828,325 for a Universal Interface System Using A Controller To Adapt To Any Connecting Peripheral Device; Klashka et al., U.S. Pat. No. 4,803,623 for a Universal Peripheral Controller Self-configuring Bootloadable Ramware; Yeh, U.S. Pat. No. 5,528,758 for the Method And Apparatus For Providing A Portable Computer With Integrated Circuit (IC) Memory Card Storage In Custom And Standard Formats, and Lentz et al., U.S. Pat. No. 5,499,384, entitled Input Output Control Unit Having Dedicated Paths For Controlling The Input And Output Of Data Between Host Processor And External Device, each seek to implement data processing systems utilizing a single controller accommodating a plurality of peripheral devices. We have noticed that these systems seem to be integrally woven into the data processing notebook and can not be reliably altered to control wireless communication devices.

SUMMARY OF THE INVENTION

Accordingly, it is one object of the present invention to provide an improved telecommunications system.

It is another object to provide a telecommunication system for providing a mode of transmission for wireless communications selected in accordance with the needs of a user.

It is still another object to provide a telecommunication system providing a plurality of different modes for wireless transmission of data.

It is yet another object to provide a telecommunication system using a single controller to accommodate transmission of data via one of a plurality of wireless communication devices having different modes for transmission of the data.

These and other objects may be achieved with a wireless communication system for selecting from among several different modes of transmission for communication of data, with a microprocessor enabling a device selected from among a plurality of wireless communication devices contained within a communication block and having different communication transmission methods; a memory for storing selected software programs for operating the selected wireless communication device enabled by the microprocessor; a controller for receiving the selected software program outputted from the memory and for outputting a communication signal for transmitting and receiving the data in response to the software program selected and read by the microprocessor from the memory; and a selector forming a communication path only to the selected wireless communication device enabled by the microprocessor from among the plurality of wireless communication devices. The system transmits and receives blocks of data when one of the plurality of wireless communication devices is enabled by the microprocessor and selected by the selector.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
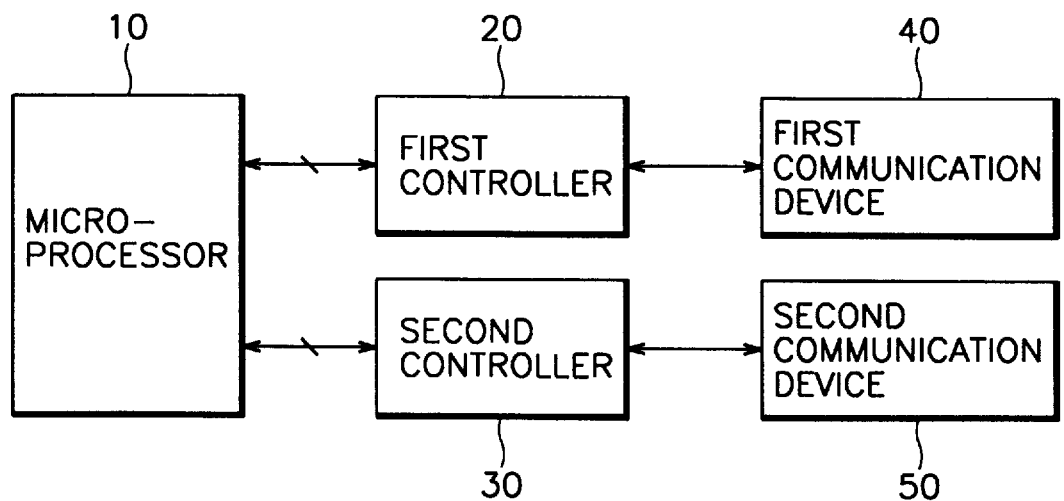
FIG. 1 is a block diagram illustrating a hypothetical representation of the salient features of an earlier wireless communication system using several wireless communication devices.

Turning to the drawings, FIG. 1 illustrates salient features of a hypothetical representation of an earlier wireless communication system using several communication devices with a microprocessor 10 outputting a communication signal for a wireless communication. First and second controllers 20 and 30 receive communication signals from the microprocessor 10 and output control signals. First and second wireless communication devices 40 and 50, operated by control signals respectively received from the first and second controllers 20 and 30, transmit the data. The operation of the second wireless communication device in this representation of an earlier wireless communication system using several communication devices is explained as follows.

The microprocessor 10 outputs a signal for the wireless communication of the communication transmission method to be used by second controller 30. The second controller 30 outputs a control signal that drives second wireless communication device 50 and, in response, second wireless communication device 50 transmits the data. We have found that these earlier wireless communication systems that use several wireless communication devices unnecessarily require a separate controller for driving a corresponding wireless communication device whenever selecting wireless communication device having a different communication transmission method that is different from that of the other wireless communication devices.

Figure 2:
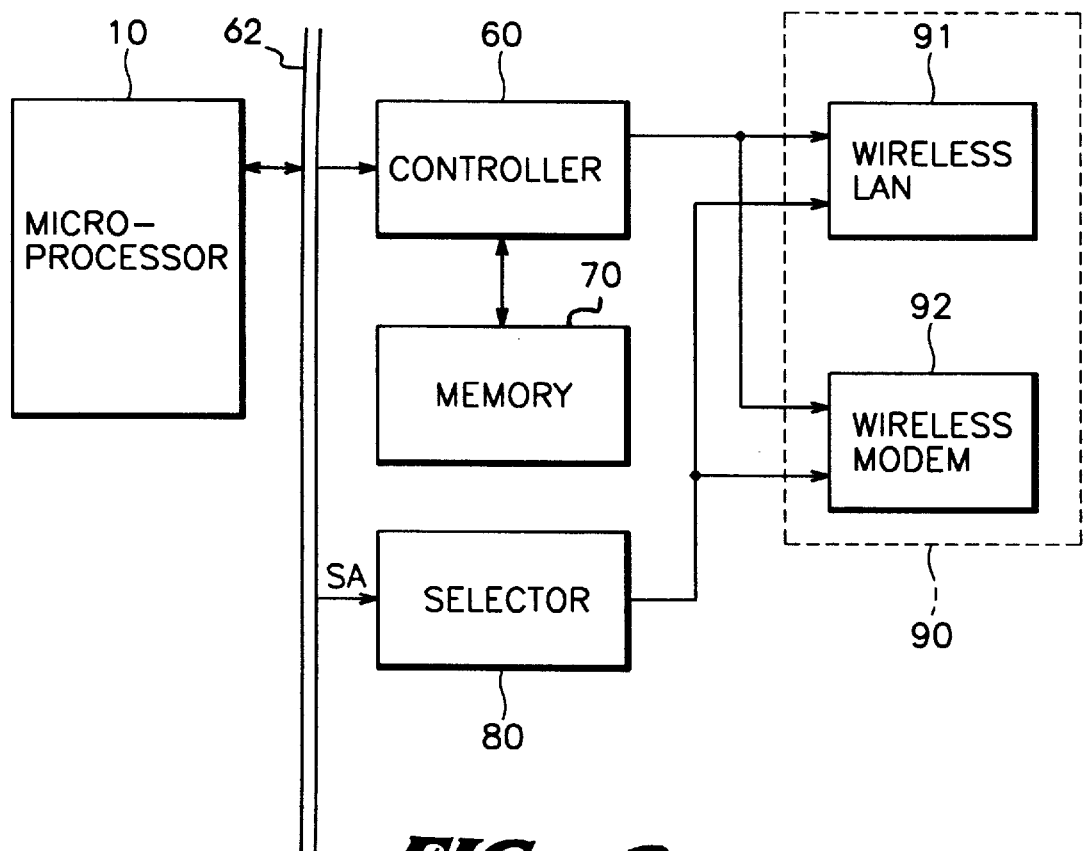
FIG. 2 is a simplified block diagram illustrating a wireless communication system constructed as a preferred embodiment of the present invention, for selecting a mode of communication of data by transmission of the data.
Figure 3:
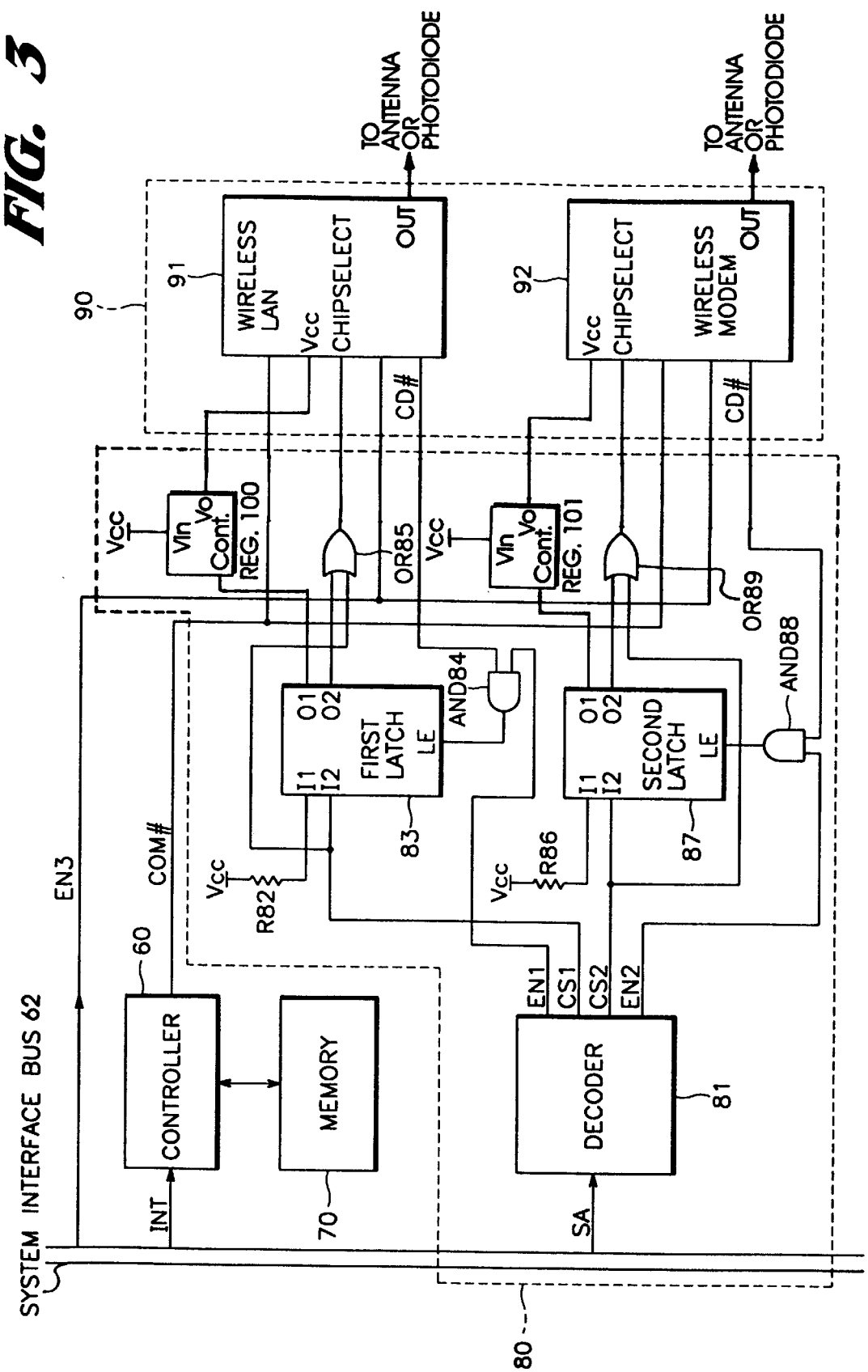
FIG. 3 is a detailed circuit diagram illustrating a wireless communication system enabling selection of a mode for communication by transmission of data via a plurality of different modes according to the principles of the present invention.

FIG. 2 is a block diagram illustrating a wireless communication system constructed according to the principles of the present invention for selecting one of a plurality of modes of communication of data via distinctly different modes of transmission, and FIG. 3 is a detailed circuit diagram illustrating a wireless communication system for selecting a mode of communication for transmission of data according to the principles of the present invention.

Referring now collectively to FIGS. 2 and 3, the wireless communication system for selecting a mode for transmission of communication data has a microprocessor 10 that enables a selected telecommunications device from among a plurality of wireless communication devices contained within a communication block 90, each one of the telecommunications devices having different modes for transmission of communication data. Memory 70 reads a selected software program for operating the wireless communication device enabled by microprocessor 10 from among a plurality of software programs stored in memory 70. Controller 60 receives the selected software program read from memory 70 and generates a communication signal that initiates transmission and reception of data. Selector 80 selects a corresponding telecommunications device in order to form a communication path via only the specific wireless communication device selected and enabled by microprocessor 10 from among the various wireless communication devices that each provide different modes for transmission. Communication block 90 transmits and receives data when one of the plurality of wireless communication devices 91 and 92 is enabled by microprocessor 10 and selected by selector 80.

Selector 80 may be constructed with a decoder 81 for generating a decoded output signal by decoding an address signal SA input thorough a system interface bus 62. The system interface bus 62 has all the signals for interfacing between the system, controller and wireless devices such as the Data bus, Address Bus, Interrupt Signal, DMA Signal, Clock, and Reset, etc. First latch 83 receives a signal exhibiting a high logical state (e.g., voltage Vcc less the potential difference lost across R82) from a pull-up resistor R82 through a first input terminal I1, and receives a first chip selection signal CS1 from the decoder 81 through a second input terminal I2, and outputs a corresponding output signal. First AND gate AND84 receives a first enable signal EN1 from decoder 81 through one input terminal, and receives a card detection signal CD# from communication block 90 through another input terminal, and provides a corresponding signal to an enable terminal LE of first latch 83. First OR gate OR85 receives the first chip selection signal CS1 from decoder 81 through one input terminal, and receives a signal from a second output terminal O2 of first latch 83, in response to reception of an output signal from first AND gate AND84, through another input terminal, and provides a corresponding signal to communication block 90. Second latch 87 receives a signal having a high logic state (e.g. voltage Vcc less the potential difference lost across R82) from a pull-up resistor R86 through first input terminal I1, and receives a second chip selection signal CS2 from decoder 81 through second input terminal I2, and provides a corresponding output signal. Second AND gate AND88 receives a second enable signal EN2 from decoder 81 through one input terminal, and receives the card detection signal CD# from communication block 90 through another input terminal, and provides a corresponding signal to the enable terminal LE of second latch 87. Second OR gate OR89 receives a second chip selection signal CS2 from decoder 81 through one input terminal, and receives a signal from second output terminal O2 of second latch 87, in response to reception of an output signal from second AND gate AND88, through another input terminal, and provides a corresponding signal to communication block 90. The CD# signal is generated when a wireless device is inserted into an extension slot of a PC or a computer. Both wireless devices can not be inserted simultaneously into two card slots.

The communication block 90 may be constructed with a telecommunications circuit such as a wireless LAN (local area network) 91 having a power terminal Vcc connected to a Regulator 100, which may include a bipolar power transistor or power field effect transistor (FET), and which is connected to the first output terminal O1 of first latch 83 in selector 80 and the card detection terminal CD# connected to the other input terminal of first AND gate AND84, and a terminal for receiving a third enable signal EN3 from the microprocessor 10. When the device is inserted into a slot, the LE signal activates the latch enable, then the 01 signal controls the Regulator or Power transistor or Power FET. One terminal is connected to receive the communication signal COM# from controller 60 and a chip selection terminal is connected to receive a signal from first OR gate OR85 in selector 80. An OUT terminal is connected to an antenna or photodiode (not shown), for example, depending upon what type of wireless LAN is being used. Wireless modem 92 has a power terminal Vcc connected to another Regulator 101, which is connected to the first output terminal O1 of the second latch 87 in selector 80 and card detection terminal CD# is connected to the other input terminal of the second AND gate AND88. A terminal is connected to receive a third enable signal EN3 from microprocessor 10. Another terminal is connected to receive the communication signal COM# from controller 60. A chip selection terminal receives a signal from second OR gate OR89 in selector 80. An OUT terminal is connected to an antenna or photodiode (not shown), for example, depending upon what type of wireless modem is being used. The COM# signal generated by controller 60 includes every signal related to a wireless communication device, e.g., a transceiver, such as the Card Enable signal, TX Data, Tx Enable, Rx Data, RX Enable. The COM# signal also enables the wireless devices 91 and 92.

In addition to the wireless LAN and the wireless modem in the communication block 90, other wireless communication devices may be provided and used, and as many devices as a user wants may be provided.

The operation of the wireless communication system for selecting a communication transmission method according to one preferred embodiment of the present invention is as follows. Controller 60, which received an interrupt signal INT, receives a software program read from memory 70 that designates a mode for transmission of data via a selected one of wireless communication devices 91 or 92, and outputs the communication signal COM# for transmitting data to or receiving data from the corresponding one of wireless communication devices 91 or 92. Microprocessor 10 outputs a signal for enabling the wireless communication device 91 or 92 to be used. The address signal SA to wireless communication device 91 or 92 to be used is applied to the decoder 81 by the system interface bus 62.

Decoder 81, which received the address signal SA, decodes the address signal SA, and outputs the enable signal EN1 or EN2 for operating the corresponding latch 83 or 87 and the chip selection signal CS1 or CS2 for selecting the corresponding wireless communication device 91 or 92. Latch 83 or 87, enabled after receiving the enable signal EN1 or EN2 from decoder 81, receives the high logic level signal from pull-up resistor R82, R86, and the chip selection signal CS1 or CS2 from the decoder 81 through the first input terminal I1 and the second input terminal I2 respectively.

The enabled latch 83 or 87 receives the input signal, supplies power by outputting a signal from the first output terminal O1 to the power terminal Vcc in the corresponding wireless communication device 91 or 92, and outputs a signal from the second output terminal O2 to one input terminal of the corresponding OR gate OR85 or OR89. The corresponding OR gate OR85 or OR89, which received the signal from the enabled latch 83 or 87 through one input terminal, receives the chip selection signal CS1 or CS2 from the decoder 81 through the other input terminal, and inputs the corresponding signal to the chip selection terminal in the wireless communication device 91 or 92 to be used. At this time, the wireless communication device 91 or 92 starts to operate and can transmit data.

For example, when the communication of data is performed through the wireless LAN 91, the operation is as follows. Controller 60, which received the interrupt signal INT, receives the software program read from memory 70 that specifies the operational details for operating the wireless LAN 91, and outputs the communication signal COM# for transmitting or receiving data via wireless LAN 91. Microprocessor 10 outputs the third enable signal EN3 for operating the wireless LAN 91 from among a plurality of wireless communication devices 91 and 92 having different communication methods. At this time, the address signal SA to the wireless local area network LAN 91 is applied to the decoder 81 through system interface bus 62. Decoder 81, which receives the address signal SA, decodes the address signal SA, and outputs the first enable signal EN1 for operating the first latch 83 and the first chip selection signal CS1 for selecting the wireless local area network LAN 91.

The first enable signal EN1 from the decoder 81, along with the card detection signal CD# from the wireless local area network LAN 91, is supplied to the first AND gate AND84. First AND gate AND 84, which received the first enable signal EN1 and the first chip selection signal CS1, supplies a high signal to the enable terminal LE in the first latch 83. First latch 83 enabled by the output signal from the first AND gate AND84 receives the high signal from the pull-up resistor R82 through the first input terminal I1 and the first chip selection signal CS1 from the decoder 81 through the second input terminal I2. First latch 83, which received the input signal, supplies the power to the power terminal Vcc in the wireless LAN 91 by outputting the signal from the first output terminal O1, and outputs the signal from the second output terminal O2 to one input terminal in the first OR gate OR85. First OR gate OR85, which received the signal from the first latch 83 through one input terminal, receives the first chip selection signal CS1 from the decoder 81 through the other input terminal, and inputs the corresponding signal to the chip selection terminal chip selection in the wireless local area network LAN 91. At this time, the wireless local area network LAN 91 starts to operate and can transmit data.

As described above, the effect of the wireless communication system for selecting a communication transmission method according to the preferred embodiment of the present invention lies in the fact that the user can select a wireless communication device, according to the user's needs in a wireless communication device having more than one communication transmission method or a plurality of wireless communication devices having different communication transmission methods, using only one controller. Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A wireless communication system for selecting a communication transmission method, comprising:

a microprocessor for enabling a device selected from among a plurality of wireless communication devices contained within a communication block and having different communication transmission methods;

a memory for outputting a selected software program for operating said selected wireless communication device enabled by said microprocessor from among a plurality of stored software programs;

a controller for receiving said selected software program from said memory and for outputting a communication signal for transmitting and receiving data; and a selector for forming a communication path only to said selected wireless communication device enabled by said microprocessor from among said plurality of wireless communication devices having different communication transmission methods;

said communication block transmitting and receiving data when one of said plurality of wireless communication devices is enabled by said microprocessor and selected by said selector;

said selector comprising:
a decoder for decoding an address signal inputted through a system interface bus and for outputting a decoded result;
a first latch for receiving a high signal from a pull-up resistor through a first input terminal, and for receiving a first chip selection signal from said decoder through a second input terminal, and for outputting a corresponding signal;
a first AND gate for receiving a first enable signal from said decoder through one input terminal, and for receiving a card detection signal from said communication block through another input terminal, and for outputting a corresponding signal to an enable terminal of said first latch;
a first OR gate for receiving said first chip selection signal from said decoder through one input terminal, and for receiving a signal from a second output terminal of said first latch, in response to an output signal from said first AND gate, through another input terminal, and for outputting a corresponding signal to said communication block;
a second latch for receiving a high signal from a pull-up resistor through a first input terminal, and for receiving a second chip selection signal from said decoder through a second input terminal, and for outputting a corresponding signal;
a second AND gate for receiving a second enable signal from said decoder through one input terminal, and for receiving a card detection signal from said communication block through another input terminal, and for outputting a corresponding signal to an enable terminal of said second latch; and
a second OR gate for receiving a second chip selection signal from said decoder through one input terminal, and for receiving a signal from a second output terminal of said second latch, in response to an output signal from said second AND gate, through another input terminal, and for outputting a corresponding signal to said communication block.

2. The wireless communication system for selecting a communication transmission method of claim 1, said communication block comprising:
a wireless local area network having a power terminal connected to a first output terminal of said first latch in said selector and a card detection terminal connected to said another input terminal of said first AND gate, and a terminal for receiving a third enable signal from said microprocessor, and a terminal for receiving said communication signal from said controller and a chip selection terminal for receiving a signal from said first OR gate of said selector; and
a wireless modem having a power terminal connected to a first output terminal of said second latch in said selector and a card detection terminal connected to said another input terminal of said second AND gate, and a terminal for receiving said third enable signal from said microprocessor, and a terminal for receiving said communication signal from said controller and a chip selection terminal for receiving a signal from said second OR gate of said selector.

3. A wireless communication method for selecting a communication transmission method comprising the steps of:
enabling a device selected from among a plurality of wireless communication devices contained within a communication block and having different communication transmission methods, the enabling being performed by a microprocessor;
outputting a selected software program for operating said selected wireless communication device enabled by said microprocessor from among a plurality of stored software programs, the selected software program being outputted by a memory;
receiving said selected software program from said memory and outputting a communication signal for transmitting and receiving data, with a controller; and
forming a communication path only to said selected wireless communication device enabled by said microprocessor from among said plurality of wireless communication devices having different communication transmission methods with a selector;
said communication block transmitting and receiving data when one of said plurality of wireless communication devices is enabled by said microprocessor and selected by said selector;
said step of forming a communication path by said selector comprising the steps of:
decoding an address signal inputted through a system interface bus and outputting a decoded result with a decoder;
receiving a high signal from a pull-up resistor through a first input terminal, and receiving a first chip selection signal from said decoder through a second input terminal, and outputting a corresponding signal with a first latch;
receiving a first enable signal from said decoder through one input terminal, and receiving a card detection signal from said communication block through another input terminal, and outputting a corresponding signal to an enable terminal of said first latch with a first AND gate;
receiving said first chip selection signal from said decoder through one input terminal, and receiving a signal from a second output terminal of said first latch, in response to an output signal from said first AND gate, through another input terminal, and outputting a corresponding signal to said communication block with a first OR gate;
receiving a high signal from a pull-up resistor through a first input terminal, and receiving a second chip selection signal from said decoder through a second input terminal, and outputting a corresponding signal with a second latch;
receiving a second enable signal from said decoder through one input terminal, and receiving a card detection signal from said communication block through another input terminal, and outputting a corresponding signal to an enable terminal of said second latch with a second AND gate; and
receiving a second chip selection signal from said decoder through one input terminal, and receiving a signal from a second output terminal of said second latch, in response to an output signal from said second AND gate, through another input terminal, and outputting a corresponding signal to said communication block with a second OR gate.

4. The wireless communication method for selecting a communication transmission method of claim 3, said step of transmitting and receiving data by said communication block comprising the steps of:
providing a wireless local area network having a power terminal connected to a first output terminal of said first latch in said selector and a card detection terminal connected to said another input terminal of said first AND gate, and a terminal for receiving a third enable signal from said microprocessor, and a terminal for receiving said communication signal from said controller and a chip selection terminal for receiving a signal from said first OR gate of said selector; and providing at least one wireless modem having a power terminal connected to a first output terminal of said second latch in said selector and a card detection terminal connected to said another input terminal of said second AND gate, and a terminal for receiving said third enable signal from said microprocessor, and a terminal for receiving said communication signal from said controller and a chip selection terminal for receiving a signal from said second OR gate of said selector.

* * * * *